US 11,244,057 B2

United States Patent
Pistoia et al.

(10) Patent No.: US 11,244,057 B2
(45) Date of Patent: Feb. 8, 2022

(54) VALUE BASED INFORMATION TRACKING FOR SECURITY ENFORCEMENT

(71) Applicant: International Business Machines Corporation, Armonk, NY (US)

(72) Inventors: Marco Pistoia, Amawalk, NY (US); Omer Tripp, Bronx, NY (US); Pietro Ferrara, White Plains, NY (US); Petar Tsankov, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 16/128,780

(22) Filed: Sep. 12, 2018

(65) Prior Publication Data

US 2020/0082096 A1 Mar. 12, 2020

(51) Int. Cl.
*G06F 21/60* (2013.01)
*G06F 21/57* (2013.01)
*G06F 9/54* (2006.01)
*G06F 21/55* (2013.01)

(52) U.S. Cl.
CPC .............. *G06F 21/577* (2013.01); *G06F 9/54* (2013.01); *G06F 21/55* (2013.01); *G06F 21/60* (2013.01)

(58) Field of Classification Search
CPC ........ G06F 21/55; G06F 21/57; G06F 21/577; G06F 21/60; G06F 9/54
See application file for complete search history.

(56) References Cited

U.S. PATENT DOCUMENTS

| 9,268,958 B1* | 2/2016 | Kessler | G06F 21/62 |
| 2012/0210437 A1* | 8/2012 | Karande | G06F 21/54 |
| | | | 726/26 |
| 2014/0380414 A1* | 12/2014 | Saidi | H04L 63/1408 |
| | | | 726/1 |

(Continued)

OTHER PUBLICATIONS

"OWASP Mobile Security Project Top 10 Mobile Risks", OWASP, https://www.owasp.org/index.php/OWASP_Mobile_Security_Project#tab=Top_10_Mobile_Risks, last modified on Apr. 27, 2017, pp. 1-3.

(Continued)

*Primary Examiner* — Theodore C Parsons
(74) *Attorney, Agent, or Firm* — Scully, Scott, Murphy & Presser, PC; Daniel P. Morris, Esq.

(57) ABSTRACT

An apparatus, method and computer program product for repairing security vulnerabilities of an application running on a mobile device. The method comprises: monitoring, by a hardware processor running a mobile device application, an application program interface (API) request associated with a data access operation, the data access operation associated with a security vulnerability. The method determines one or more private values provided by the data access operation and tracks, for each determined private value, a use of the private value by the mobile device application. Further, the method determines from the tracked usage, whether a private value has been transformed in a manner associated with the security vulnerability. For each private value that has been transformed, using the processor to modify the private value deemed a security vulnerability prior to an access by the mobile device application.

20 Claims, 4 Drawing Sheets

(56) References Cited

U.S. PATENT DOCUMENTS

| | | | |
|---|---|---|---|
| 2015/0227746 A1* | 8/2015 | Chen | G06F 21/54 |
| | | | 726/25 |
| 2016/0379010 A1* | 12/2016 | Farkash | G06F 21/6245 |
| | | | 726/1 |
| 2017/0286614 A1* | 10/2017 | Morris | H04L 9/0833 |
| 2017/0337382 A1* | 11/2017 | Alonzo | G06F 21/6245 |
| 2018/0373885 A1* | 12/2018 | Arad | G06F 21/629 |
| 2020/0293682 A1* | 9/2020 | Zonouz | G06F 21/552 |

OTHER PUBLICATIONS

Enick et al., "TaintDroid: An Information-Flow Tracking System for Realtime Privacy Monitoring on Smartphones", ACM Transactions on Computer Systems, vol. 32, No. 2, Article 5, Publication date: Jun. 2014; http://static.usenix.org/event/osdi10/tech/full_papers/Enck.pdf, pp. 1-29.

* cited by examiner

VALUE BASED INFORMATION TRACKING FOR SECURITY ENFORCEMENT

FIELD

This disclosure relates generally applications that run on mobile devices, e.g., mobile applications, and particularly, systems and for tracking information within an application for purposes of mitigating or eliminating privacy vulnerabilities.

BACKGROUND

Many mobile applications available for download on mobile devices at "app" stores, such as Apple's App Store and Google Play™, have security vulnerabilities, which exploited, may threaten the privacy of their users; e.g. see www.appthority.com/risky-apps. This happens because many mobile programmers are not security experts, and also because checking a mobile application for security vulnerabilities is a time consuming and highly nontrivial task.

Moreover, automatically repairing privacy vulnerabilities is a highly nontrivial task. Not one existing system can correctly fix applications with privacy issues.

To protect the mobile users, it is therefore critical to design techniques that can be used to enhance the security of mobile applications in an automated way.

SUMMARY

A system, method and computer program product implementing techniques for information flow tracking in order to mitigate privacy vulnerabilities in a mobile application.

The method implements information flow tracking to track a manner in which information flows through the application to correctly fix privacy vulnerabilities. In more detail, privacy vulnerabilities can be mitigated by: (1) detecting when the application releases private information to unauthorized entities; and (2) obfuscating this information before the application releases it.

In one aspect, the system and methods herein can detect and precisely pinpoint the private values in the mobile application requests in addition to automatically repairing security vulnerabilities without compromising the application's functionality.

In accordance with one aspect of the invention, there is provided a method of repairing security vulnerabilities of an application running on a mobile device. The method comprises: monitoring, by a hardware processor running a mobile device application, an application program interface (API) request associated with a data access operation, the data access operation associated with a security vulnerability; determining, using the hardware processor, one or more private values provided by the data access operation; and tracking, for each determined private value, using the hardware processor, a use of the private value by the mobile device application; determining, by the hardware processor, from the tracked usage, whether a private value has been transformed in a manner associated with the security vulnerability; and for each private value that has been transformed according to the security vulnerability, using the processor to modify the private value deemed a security vulnerability prior to an access by the mobile device application.

In a further aspect, there is provided an apparatus for repairing security vulnerabilities of an application running on a mobile device. The apparatus comprises: a memory storage device storing a program of instructions; a hardware processor device receiving the program of instructions to configure the hardware processor to: monitor a mobile device application program interface (API) request associated with a data access operation, the data access operation associated with a security vulnerability; determine one or more private values provided by the data access operation; and track, for each determined private value, a use of the private value by the mobile device application; determine, from the tracked usage, whether a private value has been transformed in a manner associated with the security vulnerability; and for each private value that has been transformed according to the security vulnerability, modify the private value deemed a security vulnerability prior to an access by the mobile device application.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

A system and method for tracking information within a mobile application and for automatically repairing privacy vulnerabilities in applications, such as run on mobile devices, e.g., smart phones, tablets, personal digital assistant's (PDAs) or other mobile devices, without compromising the applications' functionality.

Figure 1:
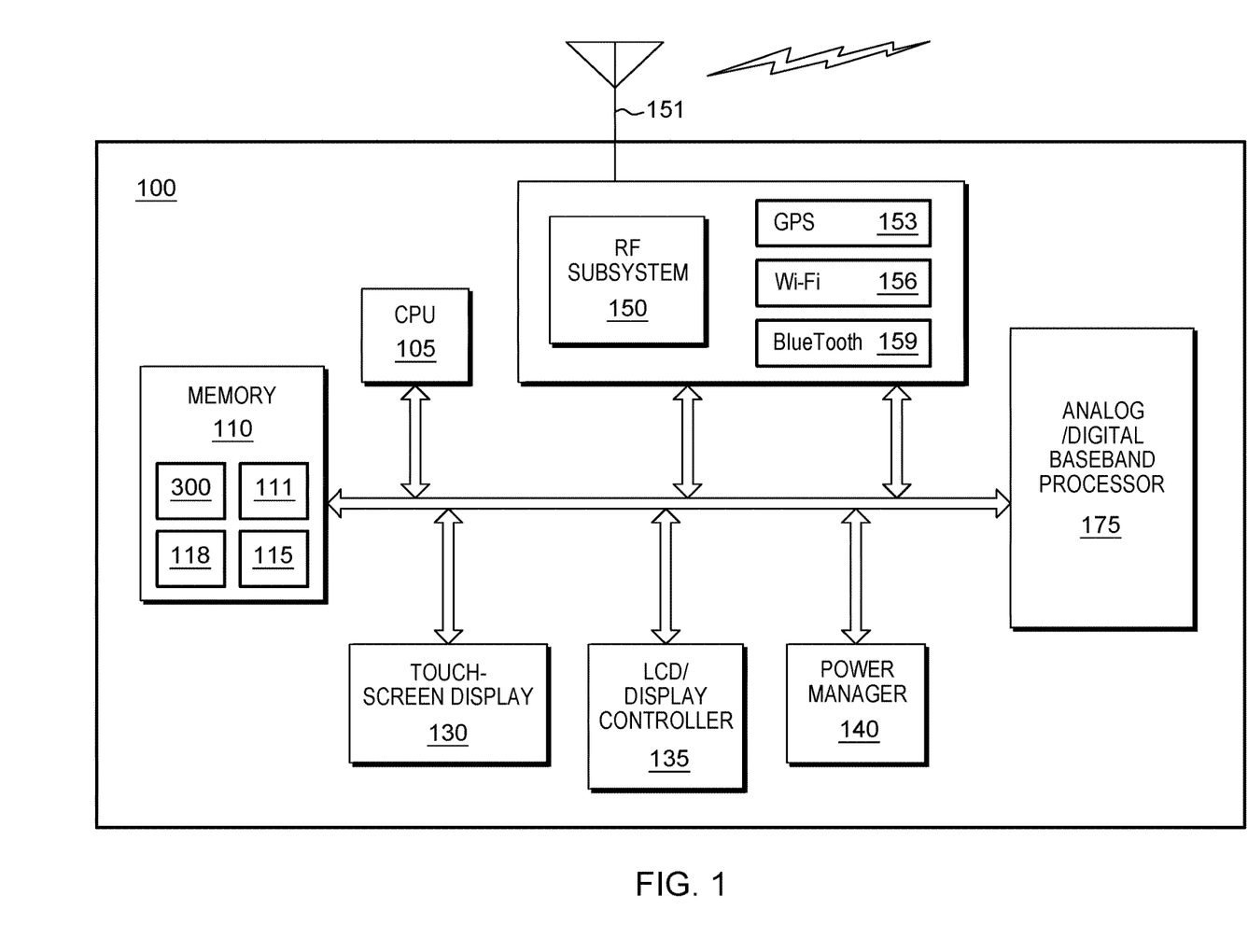
FIG. 1 schematically depicts functional operating units of a mobile phone device for carrying out methods according to the embodiments herein.

FIG. 1 schematically depicts functional units operating of a mobile phone device 100 for carrying out methods for preventing exploitation of privacy vulnerabilities in mobile phones in one embodiment. The mobile phone 100 may be a digital cellular communications device or other radio frequency communications terminal configured to operate in a switched cellular communications network, as typically known, e.g., by communicating with a cellular phone base station.

Mobile device 100 includes various hardware and software components including but not limited to: a control unit 105 such as a microprocessor or central processing unit (CPU) system with associated Read-Only Memory and Random Access Memory systems 110 having at least operating system (O/S) software 111 such as iOS (from Apple Inc.), Android (based on Linux kernal) (from Google Inc,), LG UX (from LG Electronics), Windows 10 Mobile (from Microsoft), BlackBerry OS (from Blackberry Inc.) Ubuntu, Firefox OS, WebOS, or the like. Further stored in memory 110 is application software ("apps") 115 for running mobile device operations. Such applications 115 may include various client applications, e.g., an e-mail or web browser program, or user applications and software program that may be downloaded and accessed directly using the mobile device, e.g., such as from the Apple® Store or Google® Play. Additionally shown are application program interfaces (APIs) 118 including a set of subroutine definitions, protocols, and tools that enable communication between mobile device software components and enable users to interface, e.g., via a GUI, with mobile device application functionality. For example, in the case of web services, mobile device may run representational state transfer (REST) API 118 which is a standard communications transport protocol using hypertext transport protocol (HTTP) requests such as GET( ), PUT( ), POST( ) and DELETE( ) for communicating with web-sites.

In embodiments, control processor 105 may include or be implemented as an application specific integrated circuit (ASICs), digital signal processor (DSPs), or field programmable gate arrays (FPGAs) that invoke/operate components such as a analog and/digital baseband processing units 175 configured for receiving and processing data handling interface operations for a display interface such as touch-screen display interface 130 configured for both input and output operations, any keypad for a user to interface/enter user input signals, a microphone 125 as voice input mechanism, and a camera (not shown). The CPU and analog/digital baseband processing unit 175 may interface with a Radio Frequency (RF) transceiver subsystem 150 to provide analog cellular (baseband) call processing functionality and including an operatively connected antenna 151 for transmitting/receiving cellular phone signals for initiating and conducting mobile phone calls to other parties connected over a communications network as known in the art. Further functional units provided in phone 100 may include a global positioning system (GPS) receiver 153 for providing real-time location information. Further, in one embodiment, mobile phone device is equipped with wireless communications technologies and communication protocols such as Bluetooth® 159, WIFI (e.g., 802.11a/b/g/n) 156, cellular networks (e.g., CDMA, GSM, M2M, and 3G/4G/4G LTE), near-field communications systems, satellite communications, via a local area network (LAN), via a wide area network (WAN), or any other form of communication that allows mobile phone device 100 to transmit information to or receive information.

Digital processing may further include components such as a screen display interface controller 135 to provide any operating LCD and touch-screen display processing functionality. Other features such as a battery power/power management system 140, any video output interfaces and/or USB interfaces are not shown. The CPU circuit 105 of FIG. 1 handles all internal processing, e.g., such as signal processing, data encoding and decoding operations, etc., as known in the art.

In accordance with embodiments herein, a downloaded user application software program 115 may possess a privacy vulnerability that may be exploited. For instance, some mobile phone apps may be able to access: a phone and email contacts, call logs, internet data, calendar data, data about the device's location, the device's unique IDs, information about how the user uses the app itself. In accordance with the invention, a software program 300 having programmed instructions such as provided in a device firmware (not shown), or operating system software, e.g., provided in a memory 110, is configured to run the methods described herein for mitigating privacy vulnerabilities in mobile applications.

To mitigate privacy vulnerabilities in mobile applications, programmed instructions of software program 300 invokes routines for tracking how information flows through the application. In more detail, using programmed instructions of program 300 privacy vulnerabilities can be mitigated by: (1) detecting when the application releases private information to unauthorized entities; and (2) obfuscating this information before the application releases it.

Figure 2:
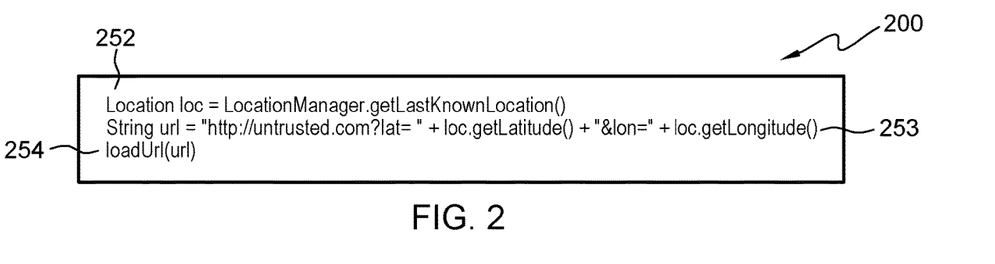
FIG. 2 illustrates an example of a concrete privacy vulnerability present in an application that configures the mobile device to send a user's location to an unauthorized advertising server.

FIG. 2 illustrates an example of a concrete privacy vulnerability 200, and particularly a section of code of an application that programs the mobile device to send a user's location to an unauthorized advertising server: http://untrusted.com.

In FIG. 2, the example code fragment 200 of a user mobile application leaks the user's location to an unauthorized server at a location "untrusted.com." That is, example code fragment 200 of the mobile application includes an instruction 252 to first obtain the device's latitude and longitude coordinates using the mobile device system's API. The mobile application then prepares HTTP GET requests and appends the latitude and longitude coordinates as parameters to the URL string 253. Then, at 254, the code fragment of the application loads the URL, and therefore sends the device's location to the external untrusted server location.

In the embodiment described herein, whenever the mobile application obtains a private value, such as the device's latitude, the methods of application 300 tracks how this value is used and transformed by the particular application. When the private value is observed at a security-sensitive method, such as a method for sending an HTTP GET request, the method precisely pinpoints the private value and how it has been transformed by the application. The method then enables a user, via an interface or automatically, to precisely modify only the private value, leaving the remaining values intact. This can be achieved in multiple ways: for example, once the user is prompted with the information about the private value that is about to be leaked by the application, the user can be prompted with an automatically-generated substitution or given the option to choose which alternative value to replace the sensitive value with. The system can also be configured in a fully automated way so that the use is not even prompted, and the sensitive values are automatically substituted with privacy-preserving values.

In one embodiment, a value-based technique for information flow tracking is provided. The proposed technique bridges the gap between the state-of-the-art techniques for information flow tracking and the requirements for automatically repairing privacy vulnerabilities in mobile applications.

Figure 3:
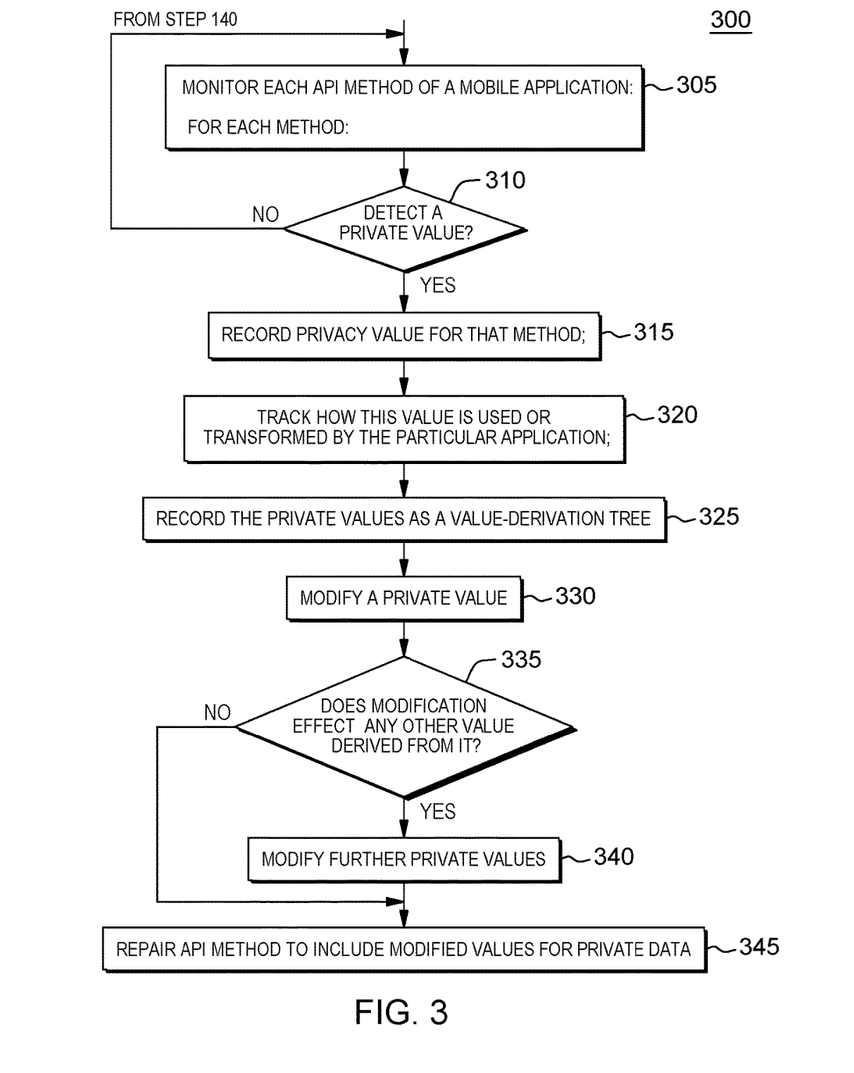
FIG. 3 depicts a method for automatically detecting and repairing privacy vulnerabilities in mobile applications as implemented in the system of FIG. 1.

FIG. 3 depicts a method 300 for automatically detecting and repairing privacy vulnerabilities in mobile applications as implemented in the system of FIG. 1. The method steps include a first step 305 which invokes operations for monitoring API methods calls of apps running at the device that provide private values. For each API method monitored, the process proceeds to 310 to detect whether there is any private data value to be sourced via the monitored API method.

In one embodiment, a mobile application 115 is provided with an API layer that allows the mobile application to interact with internal and external systems. Using the CPU or ASIC, an application API monitoring processing layer (e.g., providing an API layer interface) monitors some or all API activity, e.g., requests sent over a signal bus, to receive method calls issued by mobile applications requesting access to security-sensitive data. Generally, the APIs monitored by the methods herein pertain to data and communications of data. For example, monitoring of the API may include the CPU or ASIC programmed to extend operating system functionality to detect system calls (e.g., passed messages) responsive to high-level API requests from an API layer associated with the running mobile application being monitored. Such message may instruct an Operating System (O/S) kernal or microkernel service call for the running method. For example, monitoring can involve detecting messages invoking system service calls at the kernal level for proving a particular transforming function. This involves monitoring all the interfaces between the application code and the underlying operating system. In one embodiment, such system service calls may be used to provide the parameters, e.g., data, associated with the particular service call, e.g., an API performing a READ functionality, an API performing a GET functionality, an API performing a WRITE functionality, etc. Additionally, private values may be associated with a security-sensitive service such as a READ Service, a WRITE service, an EXECUTE service, a DELETE service, a NETWORK CONNECT service, a PERMISSION CHANGE service, etc.

Thus, as an example, the mobile device system O/S receives a request to access an API associated with a data access operation, e.g., reading a value. This request is monitored by the processor run method at 305 for monitoring application API interactions.

In one embodiment, at 305, FIG. 3, the techniques are implemented for monitoring all API methods and service calls that a mobile device application use to obtain sensitive security information such as including but not limited to: privacy-sensitive values such as the mobile device location, the mobile device's unique identifier, a user name, a user's Web surfing habits, mobile phone number, a WiFi network, and a carrier. If such a service call or method is detected, the determination is made at 305 as to whether a privacy value has been accessed. If no privacy value is being accessed/written (i.e., not detected) then the method returns to 305 to resume monitoring and detecting of a next security-sensitive API request and evaluating whether that raises privacy vulnerability concern.

If a privacy value is detected, then the process proceeds to 315, FIG. 3 for recording its value, i.e., the privacy value for that API method is stored in the mobile device memory 110, or a cache.

Continuing to 320, FIG. 3, the processor run monitoring method 300 for tracking how the detected privacy value for that method is used or transformed by the particular mobile application and at 325, generates a value-derivation tree and records any of the private values as part of the value-derivation tree.

Continuing to 330, FIG. 3, the processor run monitoring method 300 then automatically modifies the privacy value detected to be used or transformed by the mobile application. As an example, the user may change a value of the device location coordinate or change characters in its device identifier, which changed values may be temporary stored at the mobile device. In an alternate embodiment, a display may be generated via a mobile device user interface that prompts the mobile device user to modify the privacy value detected to be used or transformed by the mobile application. This process can be either interactive, with the user choosing which alternative values to use to replace the sensitive values, or otherwise automated, with the privacy-preserving values being automatically generated. It is also possible to notify the user that a value was about to be leaked, and that it is being replaced with a privacy-preserving substitution, or just proceed with the application without even notifying the user.

Continuing to 335, FIG. 3, a determination is made by monitoring method 300 whether the modification of the detected privacy value impacts or affects any other value(s) derived from it. If such modification affects other values, then the process proceeds to step 340 to modify the further private values detected by presenting via a mobile device user interface a prompts for the mobile device user to modify the privacy value detected and then the process proceeds to 345.

Thus, in the embodiments herein, the API method is repaired to provide only the modified data for the private data values requested. If at 335, FIG. 3 it is determined that the modified private value does not affect any other value derived from it, then the process proceeds directly to 345.

At 345, the method repairs the API method to include the modified values stored at the device which are returned to the method for use by the application. Thus, for the example mobile device application code fragment 200 of FIG. 2 requesting a device location for an untrusted server, the device will provide only modified longitude and latitude values back to the application.

Figure 4:
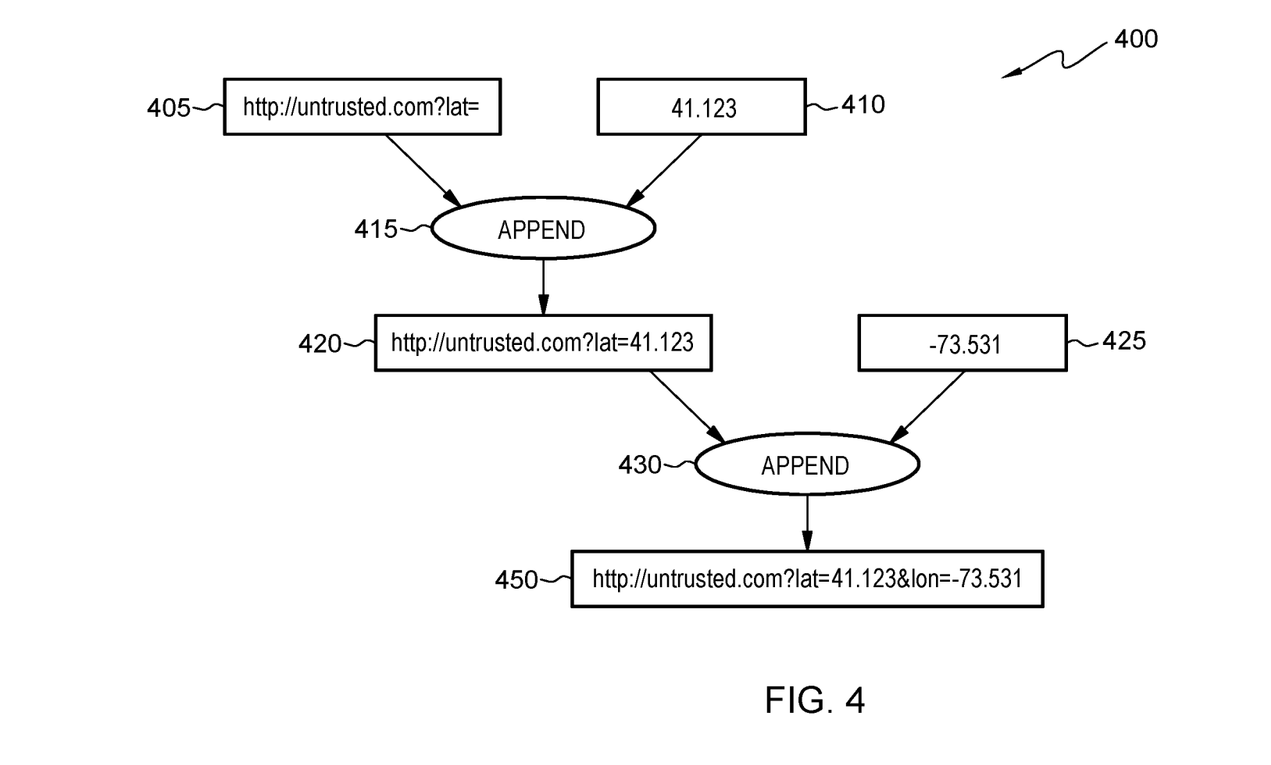
FIG. 4 depicts an example value-derivation tree performed by the methods run by the monitoring techniques of the method depicted in FIG. 3.

FIG. 4 depicts an example value-derivation tree 400 generated by the monitoring techniques and methods run by the method step 320 and 325 depicted in FIG. 3. The example value-derivation tree 400 of FIG. 4 is generated based on the running of the mobile application code fragment 200 shown in FIG. 2. In the example of FIG. 4, a value-derivation tree is constructed for a privacy vulnerability where the mobile device application appends the constant (non-sensitive) string http://untrusted.com?lat= to the sensitive latitude 41.123 and longitude −73.531.

The example value-derivation tree of FIG. 4 shows example results of monitoring API calls for a data access operation of a mobile device location at step 305 of FIG. 3. For example, by result of monitoring the API calls that interface with the services provided by the Operating System of the particular mobile device, as shown in tree 400 of FIG. 4, there is determined the operation(s) and value(s) used to transform private values. These operations and values may be recorded and stored in a memory as parameters associated with the particular service call. For example, an API requesting the mobile device's GPS location system via a GET command to obtain a current location, e.g., private latitude and longitude values obtained from the device, may be determined and recorded at 405. In one embodiment, the method 300 monitors an API method call 252 from FIG. 2, including detecting the communications (e.g., passed messages) between the Operating System kernal or microkernel and the running application being monitored.

As a result of tracking request for the concrete private value at step 310, FIG. 3 that the application obtains from a source for the given example of FIG. 2, the method initiates a recording and storing of the concrete value(s). For example, if the application API method for obtaining the device's latitude returns 41.123, the method records the concrete value 41.123 as a private value 410. Based on command 253 of FIG. 2, the method will determine the operation to append, at 415, the location to a URL associated with the untrusted external network location or web-site stored at 405.

In the example value-derivation tree of FIG. 4, the method records the resulting http://string 420 representing the transforming of the stored private current location value 410 to the untrusted URL, e.g., a constant (non-sensitive) string 405 "http://untrusted.com?lat=" which is to be returned as a string 450 to the mobile device application and transferred over a communication network by the mobile device.

FIG. 4 further depicts the results of determining further private value transformed for the privacy value vulnerability example. For example, FIG. 4 depicts a further privacy value transformation by further determining based on example code fragment 200, an operation for obtaining, by the mobile application, a related sensitive (i.e. private) longitude value −73.531 and recording it at 425. At 430, FIG. 4, the method determines and records another appending operation for further appending the stored longitude value 425 to the resulting created http://string 420 that already includes the added latitude value 410 and is destined to the same network location URL. In the example value-derivation tree 400 of FIG. 4, the method will record the final constructed URL string 450 shown as the resulting http:// string including appended latitude and longitude private value, i.e., "http://untrusted.com?lat=41.123&lon=−73.531."

To correctly fix this privacy vulnerability example, the method at 345, FIG. 3, implement a technique for modifying only those values that threaten the user's privacy. In the case of the example privacy vulnerability, the technique would modify only the latitude and longitude values in the HTTP GET request. For example, based on the constructed value-derivation tree 400, a user, via the mobile device interface, is enabled to precisely modify a private value and check how this modification changes any other values derived from it. Thus, for the given privacy vulnerability example, the method may be configured to automatically modify the stored sensitive latitude value to another value, e.g., 12.345, and additionally modify the longitude value to another value, e.g., 67.890. Thus, method recreates the value-derivation tree with the new values resulting in a modified URL string to replace string 450, e.g., http://untrusted.com?lat=12.345&lon=67.890.

Advantageously, the repaired application will not exhibit any side effects.

Figure 5:
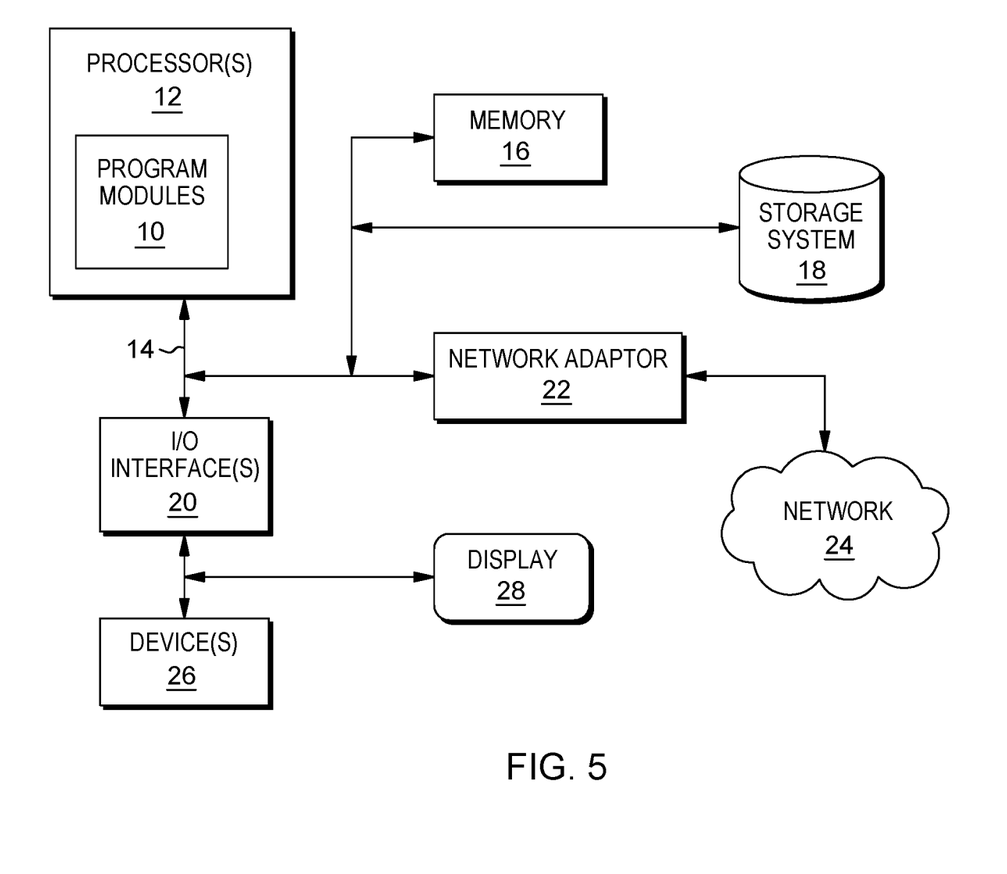
FIG. 5 depicts an exemplary hardware configuration for performing methods such as described herein.

It is understood that the methods described herein can be applied to other classes of vulnerabilities: it can also be used to automatically repair integrity vulnerabilities. Furthermore, it can be extended to other domains; for example, we can use it to automatically repair security vulnerabilities in web applications FIG. 5 illustrates an example mobile device computing system in accordance with the present invention that may provide the functions associated with the repairing of privacy vulnerabilities associated with mobile application according with the present embodiments. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIG. 3.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to:

microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of repairing security vulnerabilities of an application running on a mobile device, the method comprising:
   monitoring, by a hardware processor running a mobile device application, an application program interface (API) request associated with a data access operation, said data access operation associated with a security vulnerability;
   determining, using the hardware processor, one or more private values provided by the data access operation; and
   recording each one or more private values in a value-derivation tree;
   tracking, via the value-derivation tree, for each determined private value, using the hardware processor, a use of the private value by said mobile device application;
   determining, by the hardware processor, from said value derivation tree, whether a private value has been transformed in a manner associated with the security vulnerability; and
   for each private value that has been transformed according to the security vulnerability, using the processor to modify the private value deemed a security vulnerability prior to an access by the mobile device application.

2. The method according to claim 1, wherein the data access operation comprises: an operation for reading said private values from a specified source, said private values selected from the group of privacy-sensitive values comprising: a mobile device location, a mobile device identifier, a user name, a Web surfing habit, a mobile phone number, a WiFi network, and a carrier.

3. The method according to claim 1, wherein said determining whether the private value had been transformed includes:
   detecting an operation for writing the private value to a location for storage in a memory storage unit.

4. The method according to claim 3, wherein said determining whether the private value had been transformed includes:
   detecting an operation for sending said private value over a network connection to a specified network location.

5. The method according to claim 4, wherein said network location comprises a Uniform Resource Locator (URL), said determining whether the private value had been transformed comprises detecting an operation for appending a stored private value to said URL.

6. The method according to claim 5, wherein said tracking, for each determined private value, using the hardware processor, a use of the private value by said mobile device application comprises:
   constructing the value derivation tree.

7. The method according to claim 6, wherein said constructing the value derivation tree comprises:
   recording a representation of each data access operation used to transform a private value in a memory storage unit; and
   recording the private value data in the memory storage unit that have been subject to the transformation; and
   recording any other data values used in the transformation.

8. The method according to claim 1, wherein an API request implements a method to interface with a service provided by an Operating System of the mobile device, said determining one or more private values provided by the data access operation comprising:
   detecting, using the hardware processor, a private value associated with a security-sensitive service selected from a group of security-sensitive services comprising: a READ service, a WRITE service, an EXECUTE service, a DELETE service, a NETWORK CONNECT service, a PERMISSION CHANGE service.

9. An apparatus for repairing security vulnerabilities of an application running on a mobile device, the apparatus comprising:
   a memory storage device storing a program of instructions;
   a hardware processor device receiving said program of instructions to configure said hardware processor to:
   monitor a mobile device application program interface (API) request associated with a data access operation, said data access operation associated with a security vulnerability;
   determine one or more private values provided by the data access operation; and
   record each one or more private values in a value-derivation tree;
   track, via the value-derivation tree, for each determined private value, a use of the private value by said mobile device application;
   determine, from said value derivation tree, whether a private value has been transformed in a manner associated with the security vulnerability; and
   for each private value that has been transformed according to the security vulnerability, modify the private value deemed a security vulnerability prior to an access by the mobile device application.

10. The apparatus according to claim 9, wherein the data access operation comprises: an operation for reading said private values from a specified source, said private values selected from the group of privacy-sensitive values comprising: a mobile device location, a mobile device identifier, a user name, a Web surfing habit, a mobile phone number, a WiFi network, and a carrier.

11. The apparatus according to claim 9, wherein to determine whether the private value had been transformed, said hardware processor is further configured to:

detect an operation for writing the private value to a location for storage in the memory storage unit.

12. The apparatus according to claim 11, wherein to determine whether the private value had been transformed, said hardware processor is further configured to:

detect an operation for sending said private value over a network connection to a specified network location.

13. The apparatus according to claim 12, wherein said network location comprises a Uniform Resource Locator (URL), and to determine whether a private value has been transformed, said hardware processor is further configured to:

detect an operation for appending a stored private value to said URL.

14. The apparatus according to claim 13, wherein to track, for each determined private value, a use of the private value by said mobile device application, said hardware processor is further configured to:

construct the value derivation tree by:

recording a representation of each data access operation used to transform a private value in a memory storage unit; and recording the private value data in the memory storage unit that have been subject to the transformation; and record any other data values used in the transformation.

15. A computer readable storage medium, tangibly embodying a program of instructions executable by a mobile computing device for configuring a hardware processor of said mobile computing device to run a method comprising:

monitoring an application program interface (API) request associated with a data access operation for a mobile device application running on said mobile computing device, said data access operation associated with a security vulnerability;

determining one or more private values provided by the data access operation; and recording each one or more private values in a value-derivation tree;

tracking, via the value-derivation tree, for each determined private value, a use of the private value by said mobile device application;

determining, from said value derivation tree, whether a private value has been transformed in a manner associated with the security vulnerability; and for each private value that has been transformed according to the security vulnerability, modifying the private value deemed a security vulnerability prior to an access by the mobile device application.

16. The computer readable storage medium of claim 15, wherein the data access operation comprises: an operation for reading said private values from a specified source, said private values selected from the group of privacy-sensitive values comprising: a mobile device location, a mobile device identifier, a user name, a Web surfing habit, a mobile phone number, a WiFi network, and a carrier.

17. The computer readable storage medium of claim 15, wherein said determining whether the private value had been transformed includes:

detecting an operation for writing the private value to a location for storage in a memory storage unit.

18. The computer readable storage medium of claim 17, wherein said determining whether the private value had been transformed includes:

detecting an operation for sending said private value over a network connection to a specified network location.

19. The computer readable storage medium of claim 18, wherein said network location comprises a Uniform Resource Locator (URL), said determining whether the private value had been transformed comprises detecting an operation for appending a stored private value to said URL.

20. The computer readable storage medium of claim 19, wherein said tracking, for each determined private value, a use of the private value by said mobile device application comprises:

constructing the value derivation tree by recording a representation of each data access operation used to transform a private value in a memory storage unit; and recording the private value data in the memory storage unit that have been subject to the transformation; and recording any other data values used in the transformation.

* * * * *